US012206677B2

(12) United States Patent
Liu et al.

(10) Patent No.: US 12,206,677 B2
(45) Date of Patent: Jan. 21, 2025

(54) DETECTION OF ON-PREMISES SYSTEMS

(71) Applicant: Dell Products L.P., Round Rock, TX (US)

(72) Inventors: Jian Liu, Shanghai (CN); Michael Varteresian, Lexington, MA (US); Wenfeng Li, Shanghai (CN); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 17/568,508

(22) Filed: Jan. 4, 2022

(65) Prior Publication Data

US 2023/0216862 A1 Jul. 6, 2023

(51) Int. Cl.
*H04L 29/06* (2006.01)
*H04L 9/40* (2022.01)

(52) U.S. Cl.
CPC .................. *H04L 63/107* (2013.01)

(58) Field of Classification Search
CPC ..................................... H04L 63/107
USPC ............................................... 726/4
See application file for complete search history.

(56) References Cited

U.S. PATENT DOCUMENTS

| | | | |
|---|---|---|---|
| 2007/0168498 A1 | 7/2007 | Lambert | |
| 2009/0031013 A1 | 1/2009 | Kuchipudi et al. | |
| 2012/0110448 A1 | 5/2012 | Jhoney | |
| 2014/0351881 A1* | 11/2014 | Das | H04L 63/107 |
| | | | 726/1 |
| 2016/0134488 A1* | 5/2016 | Straub | G06F 21/44 |
| | | | 726/4 |
| 2016/0197775 A1* | 7/2016 | Chawla | H04L 43/0829 |
| | | | 709/220 |
| 2017/0006576 A1 | 1/2017 | Barrett et al. | |
| 2017/0013456 A1* | 1/2017 | Zhang | H04L 43/50 |
| 2018/0184231 A1 | 6/2018 | Egner | |
| 2018/0232256 A1 | 8/2018 | Chaganti et al. | |
| 2020/0014669 A1* | 1/2020 | Lawson | H04W 12/08 |
| 2021/0006623 A1* | 1/2021 | Joao | H04L 67/52 |

(Continued)

OTHER PUBLICATIONS

Van Dijck, "Datafication, dataism and dataveillance: Big Data between scientific paradigm and ideology", 2014, pp. 197-207 (Year: 2014).*

(Continued)

*Primary Examiner* — Taghi T Arani
*Assistant Examiner* — Gregory A Lane
(74) *Attorney, Agent, or Firm* — Jackson Walker L.L.P.

(57) ABSTRACT

An information handling system may include at least one processor and a memory. The information handling system may be configured to determine names for a plurality of other information handling systems that are on-premises at a particular datacenter having a local network associated therewith; poll a selected subset of the plurality of other information handling systems via the local network; based on results of the polling, determine whether the information handling system is on-premises at the particular datacenter; and in response to a determination that the information handling system is on-premises at the particular datacenter, enable access to at least one sensitive administration operation associated with the particular datacenter.

18 Claims, 2 Drawing Sheets

(56) References Cited

U.S. PATENT DOCUMENTS

2021/0409367 A1* 12/2021 Viswambharan ..... H04L 63/168
2022/0329604 A1* 10/2022 Guy ..................... H04L 63/102

OTHER PUBLICATIONS

Stouffer, "Guide to Industrial Control Systems (ICS) Security", 2011, NIST, pp. 1-247 (Year: 2011).*
Non-Final Office Action, U.S. Appl. No. 17/584,735 mailed Jun. 25, 2024, U.S. Patent and Trademark Office.

* cited by examiner

DETECTION OF ON-PREMISES SYSTEMS

TECHNICAL FIELD

The present disclosure relates in general to information handling systems, and more particularly to securing access to cloud-based management tools by determining whether a system is on-premises or off-premises.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), customers sometimes use cloud-based management tools to manage their information handling systems. For example, for a Dell EMC VxRail™ HCI system, a cloud-based management tool known as Analytical Consulting Engine (ACE) is one such solution. In one embodiment, a customer administrator may access a management web page hosted by an HCI manufacturer, and cloud-based tools may then provide management functionality of the customer's assets. A cloud-based management tool may also be referred to herein as a cloud management portal.

With cloud-based management tools, some operations (e.g., system upgrades and other sensitive tasks) may need the customer to input account credentials (e.g., administrator- or root-level credentials) to complete the task. For security reasons, these operations typically cannot be initiated via the cloud portal to the customer's on-premises systems through a public network such as the internet. For such sensitive operations, the customer thus may need to be on-premises to run the operations, meaning that the administrator's web browser needs to be in network communication with one or more other devices that are known to be on-premises over the secure on-premises network.

Accordingly, it is advantageous for the cloud portal system to be able to detect accurately and efficiently whether the customer is on-premises or off-premises, before enabling access to the sensitive operations on the cloud portal.

Accordingly, embodiments of this disclosure may enable detection of whether a system (e.g., a system through which an administrator is accessing a cloud management portal) is on-premises or not.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with determining whether a system is on-premises or off-premises may be reduced or eliminated.

In accordance with embodiments of the present disclosure, an information handling system may include at least one processor and a memory. The information handling system may be configured to determine names for a plurality of other information handling systems that are on-premises at a particular datacenter having a local network associated therewith; poll a selected subset of the plurality of other information handling systems via the local network; based on results of the polling, determine whether the information handling system is on-premises at the particular datacenter; and in response to a determination that the information handling system is on-premises at the particular datacenter, enable access to at least one sensitive administration operation associated with the particular datacenter.

In accordance with these and other embodiments of the present disclosure, a method may include determining, by an information handling system, names for a plurality of other information handling systems that are on-premises at a particular datacenter having a local network associated therewith; polling a selected subset of the plurality of other information handling systems via the local network; based on results of the polling, determining whether the information handling system is on-premises at the particular datacenter; and in response to a determination that the information handling system is on-premises at the particular datacenter, enabling access to at least one sensitive administration operation associated with the particular datacenter.

In accordance with these and other embodiments of the present disclosure, an article of manufacture may include a non-transitory, computer-readable medium having computer-executable instructions thereon that are executable by a processor of an information handling system for: determining names for a plurality of other information handling systems that are on-premises at a particular datacenter having a local network associated therewith; polling a selected subset of the plurality of other information handling systems via the local network; based on results of the polling, determining whether the information handling system is on-premises at the particular datacenter; and in response to a determination that the information handling system is on-premises at the particular datacenter, enabling access to at least one sensitive administration operation associated with the particular datacenter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
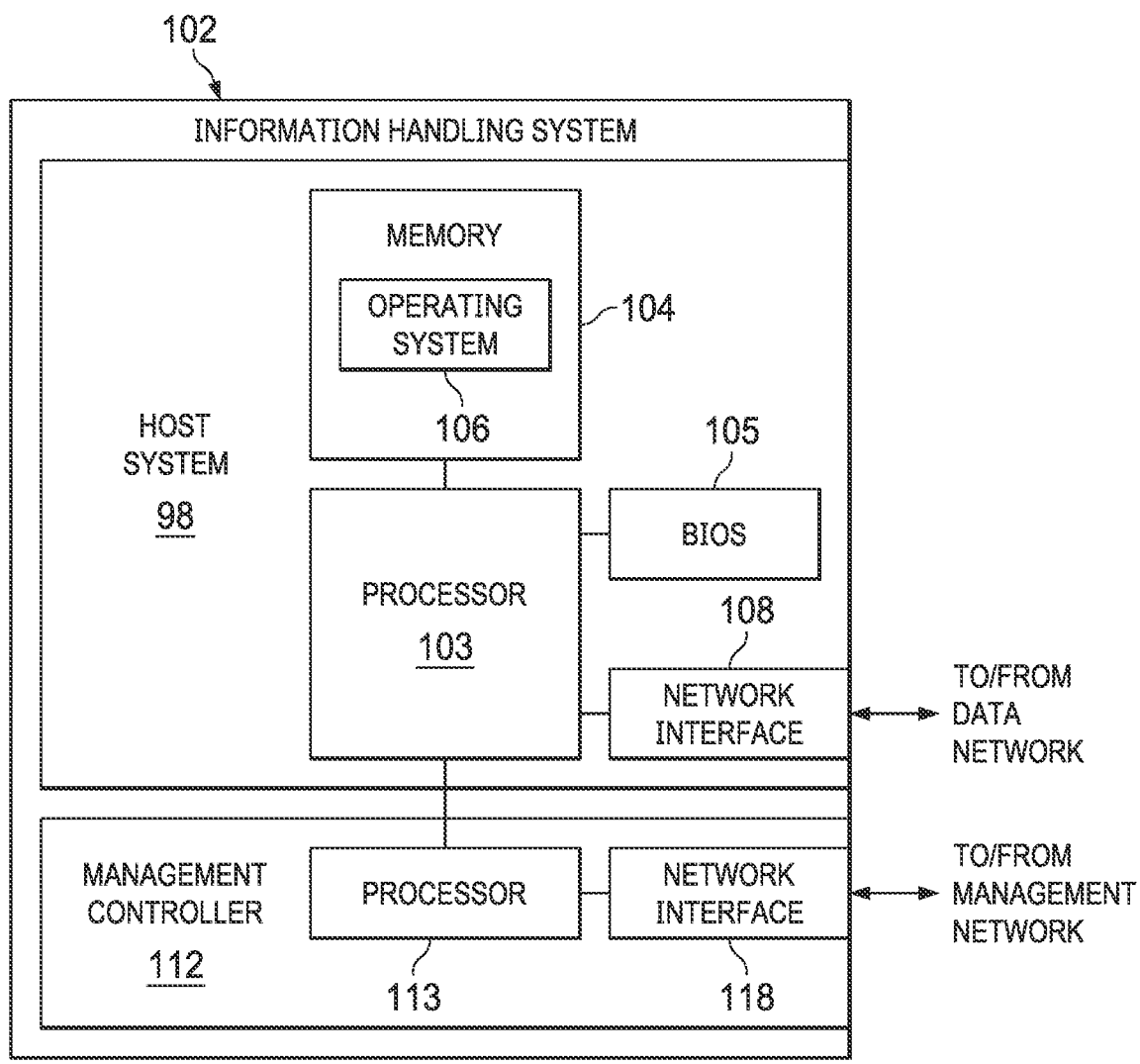
FIG. 1 illustrates a block diagram of an example information handling system, in accordance with embodiments of the present disclosure.
Figure 2:
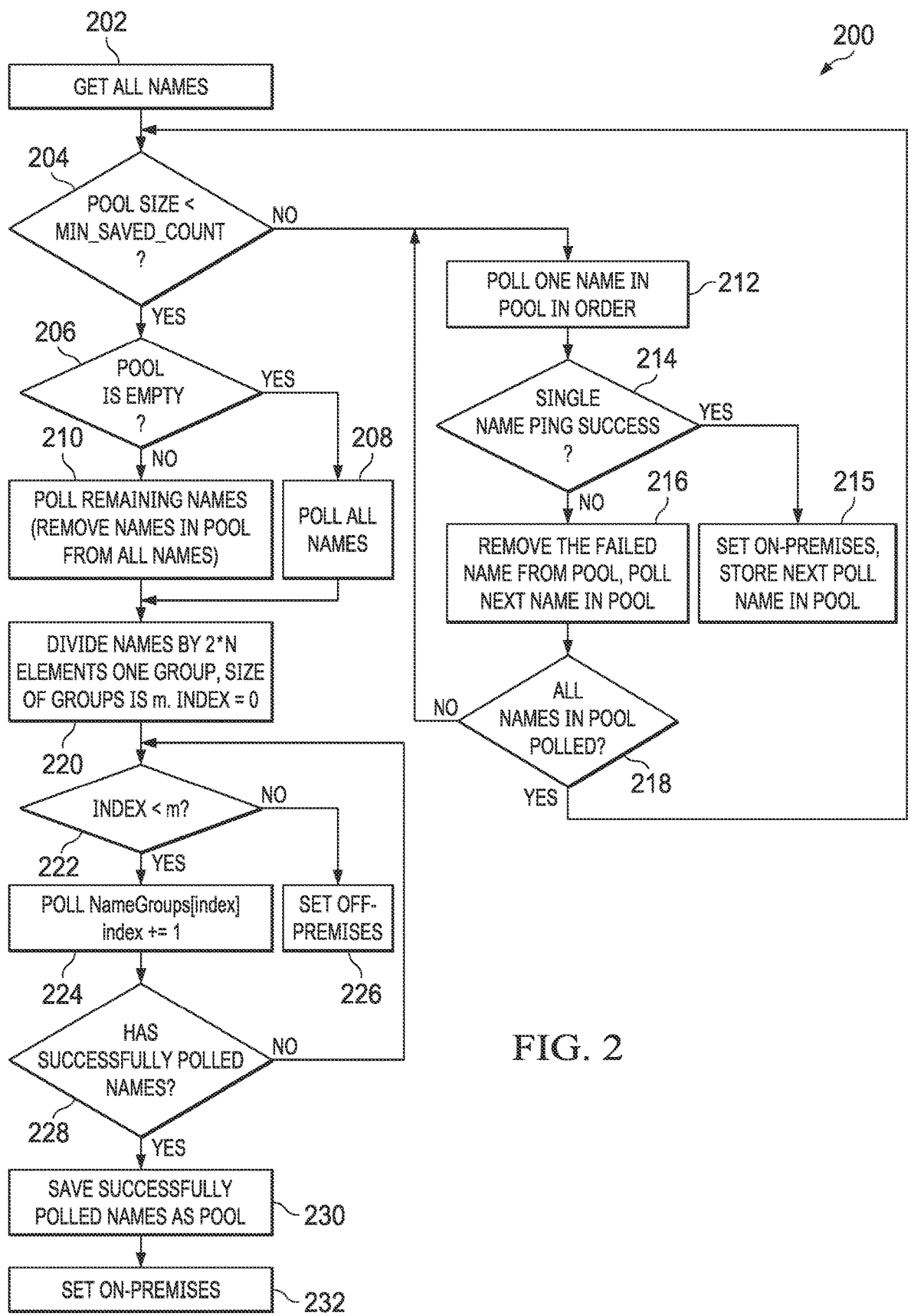
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may enable detection of whether a device (e.g., a device through which an administrator is accessing a cloud management portal) is on-premises at a customer datacenter and connecting via the local secure network vs. being off-premises and connecting via some other network such as the internet. The administrator's system that is used to connect to the cloud management portal may be referred to herein as the administrator's device.

In general, as long as the administrator's device can reach at least one on-premises system via the local network, then it may be inferred that the administrator's device is itself on-premises. For example, such systems may be polled by the administrator's system via their network names (e.g., via their fully qualified domain names (FQDNs)) to determine whether or not they are reachable via the local network.

In some embodiments, the administrator's device may not be physically located at the premises, but may instead be communicatively coupled to the premises via a virtual private network (VPN) connection or the like. For purposes of this disclosure, an administrator's device that is connected via VPN may be treated similarly to an administrator's device that is physically on-premises.

The cloud management portal typically has information regarding the network names for all (or at least some) of the on-premises systems, because such systems are in communication with the portal. For example, the cloud management portal may have at least the network names for HCI management virtual machines (VMs) or the like.

Thus in one embodiment, when the administrator's device visits the website for the cloud management portal, the portal may transmit executable code (e.g., JavaScript code) that may be run by the administrator's web browser to attempt to poll one or more on-premises systems via their network names. In other embodiments, the polling may be done in a reverse direction, wherein the cloud management portal sends instructions to the one or more on-premises systems to cause them to poll the administrator's system.

If such a polling connection is successful, then the administrator's device is deemed to be on-premises. If no such connection is successful, then the administrator's system is deemed to be off-premises. Such polling may be accomplished via an API call or via other network tools such as ping, etc.

If a determination is made that the administrator's device is on-premises, then the cloud management portal may transmit additional executable code that allows the administrator's web browser to perform various sensitive operations. If the administrator's device is off-premises, the sensitive operations may not be available. If an administrator's device is initially on-premises, but subsequently becomes off-premises (e.g., due to the loss of a VPN connection), then access to the sensitive operations may be disabled at that subsequent time.

A difficulty may arise, however, in determining which on-premises systems should be used for polling, and how often the polling should occur. In one embodiment, the cloud management portal may instruct the administrator's web browser to poll every known network name, although this may be less efficient than other embodiments disclosed herein, and it may increase the workload on such systems in responding to such polling. In another embodiment, the cloud management portal may instruct the administrator's web browser to poll one or a small number of network names in a random or pseudorandom manner, although this may be less reliable than other embodiments disclosed herein.

Thus some embodiments of this disclosure may allow for a efficient and reliable ways of deciding which network name(s) to poll at any given time to determine whether the administrator device is on-premises.

Turning now to FIG. 2, a flow chart is shown of an example method 200 for polling on-premises network names from an administrator's device to determine whether the administrator's device is also on-premises. In particular, this embodiment is based on a "pool" of network names that is constructed and updated as described below. This method may be repeated at regular intervals (e.g., once every ten seconds, once every minute, once every five minutes, or any other suitable interval) to ensure that the administrator's device is correctly classified.

At step 202, the method gets all of the network names for on-premises equipment. As noted above, the cloud management portal typically has knowledge of such names based on its normal management operations.

The first time the method is executed, the pool may be empty. Accordingly, at step 204, the pool size may be less than MIN_SAVED_COUNT (which is a configurable constant for determining whether the pool is larger or smaller than some threshold size). At step 206, the pool size is in fact zero (e.g., because it is the first time the method has been executed, or because the pool has been depleted), and so the method proceeds to step 208. At step 208, all of the names are polled. (In subsequent iterations, the pool size may be small but non-zero, in which case the method proceeds to step 210).

At step 220, the method may divide the names into groups of a selected size based on a configurable constant N. For example, N may be equal to 5 or any suitable number, which may be based on the number of devices. The names may then be divided into groups having m=2N elements, and an index variable may be set to zero.

At step 222, if the index variable is less than m, the method may proceed to step 224. Otherwise, the method may set the administrator's device to off-premises at step 226, and the method may end.

At step 224, the method may poll the names in a particular group specified by the index variable, and the index variable may be incremented. If no names have yet been successfully polled at step 228, the method may return to step 222 with the incremented index variable.

If one or more names have been successfully polled, then at step 230, the successfully polled names are saved as the name pool. And at step 232, the administrator's device is set to on-premises.

Returning now to step 204, if the pool size is greater than or equal to MIN_SAVED_COUNT, then the method may proceed to step 212. At step 212, the method may poll one name from the name pool. In some embodiments, the name pool may be stored in a data structure that allows for an ordering of elements, and so the one name that is polled may be the first or next name in the pool.

If that polling operation is successful at step 214, then the method may proceed to step 215. At step 215, the administrator's device may be set to on-premises, the next name to be polled may be stored in the name pool, and the method may end.

Alternatively, at step 216, the failed network name may be removed from the pool, and the next network name in the pool may be polled. This process may repeat at step 218 until either a successful name is polled, or all names in the pool are exhausted.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor comprising physical processor circuitry; and
   a memory;
   wherein the information handling system is configured to:
   determine names for a plurality of other information handling systems that are on-premises at a particular datacenter having a local network associated therewith;
   determine a selected subset of the plurality of other information handling systems by:
   maintaining a pool indicative of at least some of the other information handling systems;
   adding and/or removing particular ones of the other information handling systems to and/or from the pool based on a size of the pool; and
   selecting the selected subset of the plurality of other information handling system from the pool;

poll the selected subset of the plurality of other information handling systems via the local network;

based on results of the polling, determine whether the information handling system is on-premises at the particular datacenter; and in response to a determination that the information handling system is on-premises at the particular datacenter, enable access to at least one sensitive administration operation associated with the particular datacenter.

2. The information handling system of claim 1, wherein the names for the plurality of other information handling systems comprise fully qualified domain names (FQDNs).

3. The information handling system of claim 1, wherein the information handling system is configured to receive executable code at a web browser thereof, the executable code being usable to perform the polling.

4. The information handling system of claim 3, wherein the executable code comprises JavaScript code.

5. The information handling system of claim 1, wherein the polling includes performing an application programming interface (API) call.

6. The information handling system of claim 1, wherein the polling includes performing a ping.

7. A computer-implemented method comprising:

determining, by an information handling system, names for a plurality of other information handling systems that are on-premises at a particular datacenter having a local network associated therewith;

the information handling system determining a selected subset of the plurality of other information handling systems by:

maintaining a pool indicative of at least some of the other information handling systems;

adding and/or removing particular ones of the other information handling systems to and/or from the pool based on a size of the pool; and selecting the selected subset of the plurality of other information handling system from the pool;

polling the selected subset of the plurality of other information handling systems via the local network;

based on results of the polling, determining whether the information handling system is on-premises at the particular datacenter; and in response to a determination that the information handling system is on-premises at the particular datacenter, enabling access to at least one sensitive administration operation associated with the particular datacenter.

8. The method of claim 7, wherein the names for the plurality of other information handling systems comprise fully qualified domain names (FQDNs).

9. The method of claim 7, further comprising receiving executable code at a web browser of the information handling system, the executable code being usable to perform the polling.

10. The method of claim 9, wherein the executable code comprises JavaScript code.

11. The method of claim 7, wherein the polling includes performing an application programming interface (API) call.

12. The method of claim 11, wherein the polling includes performing a ping.

13. An article of manufacture comprising a non-transitory, computer-readable medium having computer-executable instructions thereon that are executable by a processor of an information handling system for:

determining names for a plurality of other information handling systems that are on-premises at a particular datacenter having a local network associated therewith;

determining a selected subset of the plurality of other information handling systems by:

maintaining a pool indicative of at least some of the other information handling systems;

adding and/or removing particular ones of the other information handling systems to and/or from the pool based on a size of the pool; and selecting the selected subset of the plurality of other information handling system from the pool;

polling the selected subset of the plurality of other information handling systems via the local network;

based on results of the polling, determining whether the information handling system is on-premises at the particular datacenter; and in response to a determination that the information handling system is on-premises at the particular datacenter, enabling access to at least one sensitive administration operation associated with the particular datacenter.

14. The article of claim 13, wherein the names for the plurality of other information handling systems comprise fully qualified domain names (FQDNs).

15. The article of claim 13, wherein the instructions are further executable for receiving executable code at a web browser of the information handling system, the executable code being usable to perform the polling.

16. The article of claim 15, wherein the executable code comprises JavaScript code.

17. The article of claim 13, wherein the polling includes performing an application programming interface (API) call.

18. The article of claim 17, wherein the polling includes performing a ping.

* * * * *